US009993012B2

(12) United States Patent
Laurijssen (10) Patent No.: US 9,993,012 B2
(45) Date of Patent: Jun. 12, 2018

(54) SYSTEM FOR PRODUCING CHOCOLATE-BASED ARTICLES

(71) Applicant: SANDVIK FINANCE B.V., Schiedam (NL)

(72) Inventor: F. W. A. Laurijssen, Baarle-Nassau (NL)

(73) Assignee: SGL Technology B.V., Breda (NL)

( * ) Notice: Subject to any disclaimer, the term of this patent is extended or adjusted under 35 U.S.C. 154(b) by 0 days. days.

(21) Appl. No.: 15/119,736

(22) PCT Filed: Feb. 20, 2014

(86) PCT No.: PCT/EP2014/053363
§ 371 (c)(1),
(2) Date: Aug. 18, 2016

(87) PCT Pub. No.: WO2015/124194
PCT Pub. Date: Aug. 27, 2015

(65) Prior Publication Data
US 2017/0049123 A1 Feb. 23, 2017

(51) Int. Cl.
*B65G 45/12* (2006.01)
*A23G 1/20* (2006.01)
(Continued)

(52) U.S. Cl.
CPC ............ *A23G 1/205* (2013.01); *A23G 1/005* (2013.01); *A23G 1/0063* (2013.01);
(Continued)

(58) Field of Classification Search
CPC ........ B65G 45/12; A23G 1/205; A23G 1/005; A23G 1/0063; A23G 1/0093; A23G 1/26
(Continued)

(56) References Cited

U.S. PATENT DOCUMENTS 2,136,969 A * 11/1938 Downey ................. F28C 3/005
198/603
3,966,997 A * 6/1976 Warkentin ............. A23G 1/047
426/601
(Continued)

FOREIGN PATENT DOCUMENTS

EP 0157290 A2 10/1985
EP 0855142 A2 7/1998
(Continued)

OTHER PUBLICATIONS

"UCM Shell Chocolate Moulding Plant", Confectionary Production, Specialized Publications Ltd., Surrey, GB, vol. 57, No. 10, Oct. 1, 1991, p. 768-770.

*Primary Examiner* — William R Harp
(74) *Attorney, Agent, or Firm* — Morgan, Lewis & Bockius LLP (57) ABSTRACT

A system for producing chocolate-based articles in solidifying form includes a transportation system having at least a first conveyor belt looped around at least a first and second axes. A dispensing unit is arranged to dispense chocolate mass in liquid form along an outer surface of a top load carrying side of the at least first conveyor belt. The at least one conveyor belt is arranged for transporting the chocolate mass through at least one cooling chamber at a predetermined speed along a first and a second cooling path, which may be positioned opposite one another. The system may further include a release mechanism positioned along the second cooling path for releasing the chocolate mass from an outer surface of the bottom load carrying side of the at least first conveyor belt.

19 Claims, 6 Drawing Sheets

(51) Int. Cl.
*A23G 1/00* (2006.01)
*A23G 7/00* (2006.01)
*A23G 7/02* (2006.01)

(52) U.S. Cl.
CPC ......... *A23G 1/0093* (2013.01); *A23G 7/0093* (2013.01); *A23G 7/02* (2013.01)

(58) Field of Classification Search
USPC ........................................................ 198/497
See application file for complete search history.

(56) References Cited

U.S. PATENT DOCUMENTS

| | | | | |
|---|---|---|---|---|
| 5,180,602 | A * | 1/1993 | Bainbridge | A23G 1/21 118/13 |
| 6,159,520 | A * | 12/2000 | Aasted | A23G 1/26 425/134 |
| 7,658,958 | B2 * | 2/2010 | Hansen | A23G 9/04 425/112 |
| 2006/0163039 | A1 * | 7/2006 | Marshall | B65G 15/54 198/778 |
| 2008/0274241 | A1 | 11/2008 | Steuer et al. | |
| 2011/0041706 | A1 * | 2/2011 | Whetstone, Jr. | A23G 1/22 99/353 |

FOREIGN PATENT DOCUMENTS

| | | |
|---|---|---|
| WO | 9804160 A1 | 2/1998 |
| WO | 2009007801 A1 | 1/2009 |

* cited by examiner

SYSTEM FOR PRODUCING CHOCOLATE-BASED ARTICLES

RELATED APPLICATION DATA

This application is a § 371 National Stage Application of PCT International Application No. PCT/EP2014/053363 filed Feb. 20, 2014.

TECHNICAL FIELD

The present invention relates to a system for producing chocolate-based articles is solidifying form and to a method for using such a system.

BACKGROUND ART

Production of chocolate-based articles in solidifying form, such as chocolate chips or chocolate chunks, generally requires the execution of a series of processing steps under predetermined conditions to ensure that the final chocolate-based articles have a desired appearance and texture. It is well known in the art that chocolate contains solid particles dispersed throughout a fat matrix, wherein the term "fat" may include both cocoa butter and milk fat. The state of the chocolate fat can change depending on the temperature of the environment. For example, in room temperature, chocolate is in a solid state, while when heated above a certain temperature threshold point, it can be melted into a molten or liquid state so that it flows as a fluid. The liquid state of the chocolate is reversible and will return back to a solid state when cooled back below the threshold temperature point.

In view of the above, a typical production method for producing chocolate-based articles in solidifying form may start by completely melting the chocolate fat to a liquid state. Once the chocolate fat has been melted, the next step may involve the tempering of the chocolate, wherein small stable crystals are formed through the chocolate fat in the liquid state. The chocolate tempering step, although not always necessary, ensures that the chocolate solidifies with a desired shiny and smooth surface. After melting and tempering, the liquid chocolate mass may then be deposited into mould trays or directly onto another surface, which is typically cooled in a temperature and humidity-controlled environment, such as a cooling chamber. The cooling process may typically take anywhere between 10 minutes to 40 minutes depending on the type of chocolate-based articles produced and may require that the liquid chocolate mass is transported through a number of cooling zones to prevent sudden changes in temperature and humidity. Such changes may cause the destabilization of the chocolate butter crystals formed during the tempering process and may result in the chocolate-based article having an undesired appearance and texture. Typically the chocolate mass is transported through the cooling chamber by means of a conveyor belt, which transports the liquid chocolate mass along the different cooling zones in the cooling chamber before it is collected at an exit point. The dimensions and speed of the conveyor belt together with the cooling chamber conditions are adapted such that during transportation of the chocolate mass along the different cooling zones the liquid chocolate mass cools substantially uniformly throughout.

Conventional systems for producing chocolate-based articles are well known in the art. Such systems may comprise a transportation system arranged to carry the liquid chocolate mass onto a top load carrying side of a conveyor belt along the different cooling zones of the cooling chamber. Considering that a cooling process may take anywhere between 10 to 40 minutes, the conveyor belt of the conventional system needs to be dimensioned accordingly in order to ensure that the finished chocolate-based articles have the desired appearance and texture. Due to the considerably long cooling process, conventional systems for producing chocolate-based articles may require a conveyor belt having a large area overhead. As a result using a conventional system may limit the total number of systems that can work in parallel on a production facility of given dimensions, thereby negatively affecting the production throughput of this production facility. Furthermore, the size of the system would inevitably determine the size of the production facility needed, thus a larger system would require a larger facility that would incur a higher cost.

US2008/0274241 relates to a system for producing chocolate articles in a retail unit. The system uses a rapid cooling process for cooling the liquid chocolate mass faster, which has as an effect that the overall dimensions of the system can be reduced so that it fits in a retail unit space. However, cooling the liquid chocolate too rapidly, as previously discussed, may destabilise the crystal in the chocolate fat leading to a finished chocolate-based article that does not meet the production requirements.

DISCLOSURE OF THE INVENTION

It is an aim of the present invention to provide a system for producing chocolate based articles in solidifying form having a small area overhead while ensuring that the finished chocolate-based articles have a desired appearance and texture.

This aim is achieved according to the invention with the system showing the technical characteristics of the characterising part of the first claim.

More in particular, according to a first aspect of the present invention a system for producing chocolate-based articles in solidifying form is provided. The system may comprise a transportation system comprising at least a first conveyor belt looped around at least a first and a second axis. The at least first conveyor belt may comprise a substantially flat top load carrying side and a substantially flat bottom load carrying side, interconnected with one another via at least a first and second curved surfaces, formed respectively at the location of the at least first and second axes. The system may further comprise a dispensing unit positioned at an entry point of the transportation system and arranged for dispensing chocolate mass in liquid form along an outer surface of the top load carrying side of the at least first conveyor belt. For example, the dispensing unit may be suitable for dispensing chocolate mass in the form of continuous strips or individual droplets. The conveyor belt may be arranged for transporting the chocolate mass through at least one cooling chamber at a predetermined speed along a first and a second cooling path. The cooling chamber may be arranged for cooling the liquid chocolate mass under predetermined conditions before the chocolate mass is collected at an exit point of the transportation system.

The first and second cooling paths may be positioned opposite one another and may further be connected via at least the first curved surface such that the direction in which the chocolate mass is transported in the second cooling path is opposite to that of the first cooling path. For example, the first and second cooling paths may be located respectively on the top load carrying side and bottom load carrying side of the conveyor belt. It has been found that by positioning the first and second cooling paths opposite one another, the area overhead of the system can be significantly reduced. By reducing the area overhead of the system, the problems related to the use of conventional systems with respect to the production facility space limitations and production throughput are overcome.

Furthermore, the system may further comprise a release mechanism positioned along the second cooling path and arranged for releasing the chocolate mass from an outer surface of the bottom load carrying side of the at least first conveyor belt. For example, the release mechanism may be provided with a cutting edge, such as in the form of a knife or scraper, suitable for dislodging the chocolate mass from the outer surface of the bottom load carrying side of the conveyor belt. According to embodiments of the present invention, the release mechanism may alternatively or in combination comprise a sharp edge in the conveyor belt formed by an arrangement of axes positioned along the second cooling path and arranged to cooperate with the conveyor belt such that the chocolate mass at the location of the release mechanism is subjected to a sudden change in the inclination of the conveyor belt thereby causing the chocolate mass to be dislodged from the outer surface of the bottom load carrying side of the conveyor belt. According to further embodiments of the present invention, the sharp edge may be formed by using a second axis that has a substantially smaller diameter compared to the diameter of the first axis.

According to embodiments of the present invention, the adherence properties of the liquid mass may be significantly enhanced by adapting the cooling conditions of the cooling chamber and speed of the at least first conveyor belt such that the chocolate mass is arranged to adhere to the outer surfaces of the top and bottom load carrying sides of the at least first conveyor belt. The adherence of the chocolate mass to the outer surfaces of the conveyor belt may enable the transportation of the liquid chocolate mass along the first and second cooling paths via at least the first curved surface, thereby contributing to the reduction of the area overhead of the system. The transportation of the chocolate mass along the second cooling path may be performed by ensuring that the chocolate mass sufficiently adheres to the outer surface of the top and bottom load carrying side of the at least first conveyor belt. The adherence of the chocolate mass may for example be enhanced by adapting the speed and cooling conditions of the cooling chamber such that during transportation of the chocolate mass along the first and second cooling path, a part of the chocolate mass in contact with the outer surface of the top and bottom load carrying sides of the conveyor belt remains in liquid form.

According to embodiments of the present invention, the adherence properties of the liquid chocolate mass may further be enhanced by choosing a suitable material for the outer surface of the top and bottom load carrying side of the at least first conveyor belt. For example, the outer surfaces of the at least first conveyor belt may be made from a polymer-based material, such as plastic or rubber. Furthermore, the outer surface of the at least first conveyor belt may be made from a metal-based material such aluminium.

According to embodiments of the present invention, the diameter of at least the first axis may be at least 100.0 mm, at most 1000.0 mm, preferably at most 800.0 mm, more preferably at most 500.0 mm, and even more preferably at most 400.0 mm. The diameter of the at least the first axis may be chosen such that the inclination experienced by the chocolate mass at the location of the curved surfaces when transported between the top and bottom flat load carrying sides is as gradual as possible, thereby ensuring that the chocolate mass may remain adhered to the outer surface at the location of the curved surfaces.

According to embodiments of the present invention, the at least first conveyor belt may be arranged to have a wrap angle at the location of the curved surfaces which may be in the range of 120.0 to 180.0 degrees.

According to embodiments of the present invention, the at least first and second axes may be pulleys, at least one of which may be arranged as a drive pulley.

According to embodiments of the present invention, the system of the present invention may comprise a cutting mechanism positioned at the location of the first curved surface, which may be used for cutting the chocolate mass into predetermined sized pieces.

According to embodiments of the present invention, the transportation system may comprise at least a second conveyor belt arranged for collecting the chocolate mass released by the release mechanism. The at least second conveyor belt may be arranged for transporting the chocolate mass through the cooling mechanism along a third cooling path before the chocolate mass is collected at the exit point of the transportation system. The at least third cooling path may be positioned opposite the second cooling path and arranged such that the chocolate articles are transported along the third cooling path in the opposite transport direction to that of the second cooling path. It has been found that the use of at least a second conveyor belt may further reduce the total area overhead of the system while at the same time ensuring that the chocolate mass cools uniformly under the right conditions in the cooling chamber.

According to a second aspect of the invention, a method for producing chocolate-based articles in solidifying form is provided. The method may comprise the step of providing a transportation system having at least a first conveyor belt looped around at least a first and a second axis, wherein the at least first conveyor belt comprises a substantially flat top load carrying side and a substantially flat bottom load carrying side interconnected with one another via at least first and second curved surfaces formed respectively at the location of the at least first and second axes. The method may further comprise the step of dispensing chocolate mass in liquid form along the top load carrying side of the at least first conveyor belt by means of a dispensing unit positioned at an entry point of the transportation system. The liquid chocolate mass may then be transported at a predetermined speed through at least one cooling chamber by means of the at least first conveyor belt, the cooling chamber being arranged for cooling the liquid chocolate mass under predetermined conditions before the chocolate mass is collected at an exit point of the transportation system. The method may further comprise the steps arranging the first and second cooling paths such that they are positioned opposite one another and are connected via at least the first curved surface so that the direction in which the chocolate mass is transported in the second cooling path is opposite to that of the first cooling path. Furthermore, the method may comprise the step of providing a release mechanism along the second cooling path, which may be arranged for releasing the solidified chocolate articles from an outer surface of the bottom load carrying side of the at least first conveyor belt.

BRIEF DESCRIPTION OF THE DRAWINGS

The invention will be further elucidated by means of the following description and the appended figures.

MODES FOR CARRYING OUT THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The term "chocolate-based articles" refers to chocolate products that are stable at ambient temperatures and may take the form of solid pieces of chlorate, such as chocolate bars, chocolate chunks, or chocolate droplets, or other products incorporating chocolate as a component, for example for coating other food products, such as nuts, fruits and the like.

The term "chocolate-based articles in solidifying form" refers to melted chocolate which has been cooled to produce a solid chocolate wherein at least a portion, preferably a substantial part, of the fat of the chocolate is in solid state.

Figure 1:
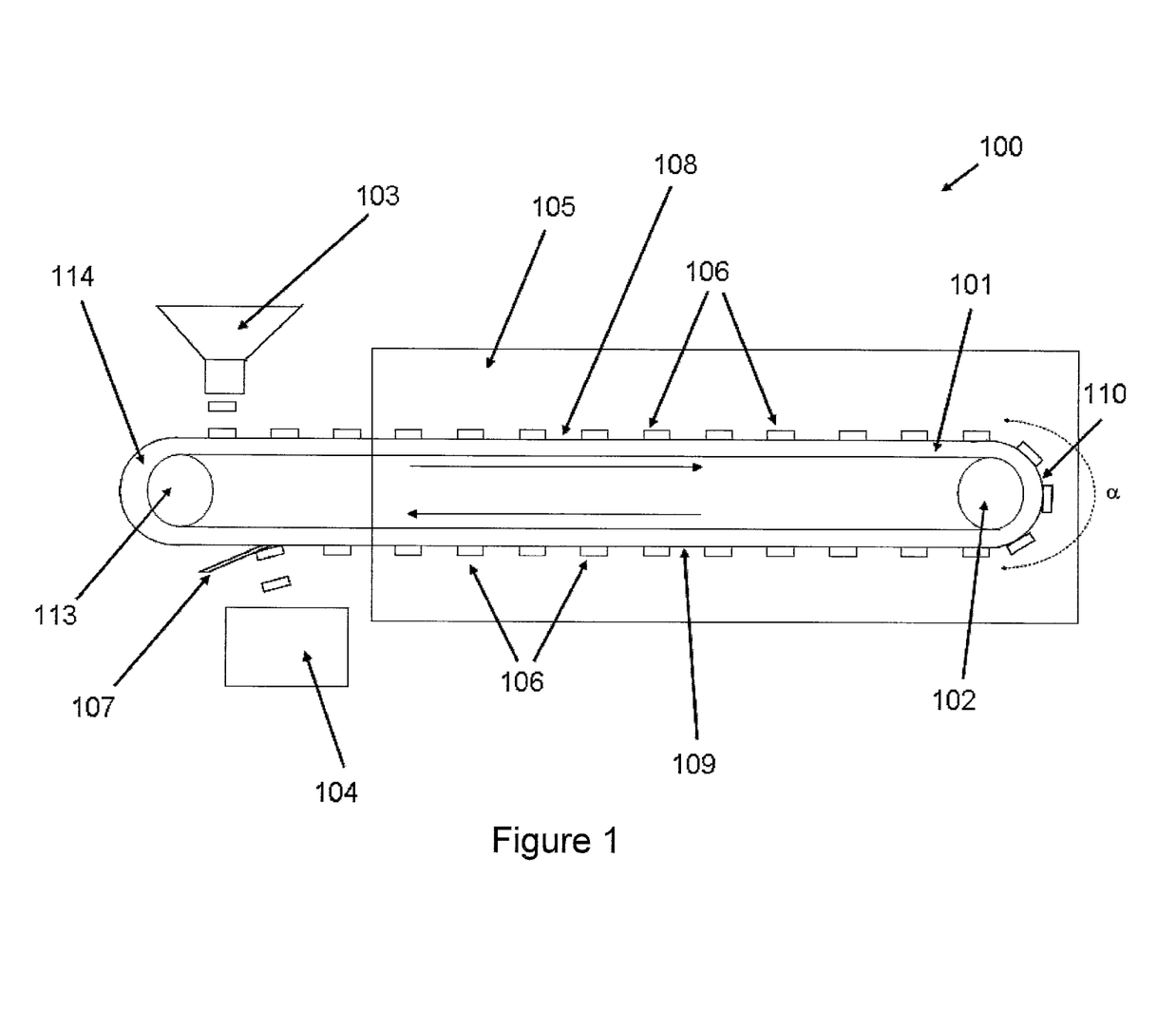
FIGS. 1 to 3 show cross-sectional views of a system for producing chocolate-based articles in solidifying form according to embodiments of the present invention.

FIG. 1 shows an example of a system 100 for producing chocolate-based articles in solidifying form according to an embodiment of the present invention. The system 100 may comprise a chocolate dispensing unit 103 arranged for dispensing chocolate mass 106 in liquid form along an outer surface of a top load carrying side 108 of at least a first conveyor belt 101, which may be part of a transportation system. The at least first conveyor belt 101 may be looped around at least a first and second axes 102 and 113, thereby forming substantially flat top and bottom load carrying sides 108 and 109 interconnected with one another via at least a first and second curved surface 110 and 114 formed respectively at the location of the at least first and second axes 102, 113. For example, the first and second axes 102 and 113 may be provided in the form of pulleys at least one of which may be configured as a drive pulley. The at least first conveyor belt 101 may be arranged for transporting the chocolate mass 106 through a cooling chamber 105 along a first and a second cooling path such that the liquid chocolate mass 106 solidifies under predetermined conditions before the chocolate mass 106 is collected at an exit point 104 of the transportation system. As previously discussed, the temperature and humidity of the cooling chamber 105 may play an important role in the appearance and texture of the final chocolate-based article. For this reason, the cooling chamber 105 may comprise a number of cooling zones (not shown) in order to prevent sudden changes of temperature and humidity. The cooling chamber 105 is for example provided for circulating cooling air by a ventilation system, for example provided with at least one ventilator in the system 100, the ventilator for example being provided with a cooling unit at the air intake of the at least one ventilator so that air sucked into the ventilator is first cooled by the cooling unit. Although the ventilating system is not shown in the figures, the ventilation system is provided for providing and circulating cooled air through the cooling chamber 105.

According to an embodiment of the present invention the first and second cooling paths may be positioned opposite one another and may be connected via at least the first curved surface 110 such that the direction in which the chocolate mass 106 is transported along the second cooling path is opposite to that of the first cooling path. For example, the first and second cooling paths may be located respectively on the top load carrying side 108 and bottom load carrying side 109 of the conveyor belt 101. Positioning the first and second cooling paths opposite one another may result in a reduction of the area overhead of the system 100 since the transportation of the chocolate mass 106 along the second cooling path reuses the area taken by the first cooling path. A reduction of the area overhead of the system 100 may contribute to overcome the problems related to the use of conventional systems with respect to the production facility space limitations and production throughput. The transportation of the chocolate mass 106 along the second cooling path may be performed by ensuring that the chocolate mass 106 sufficiently adheres to the outer surface of the top and bottom load carrying side 108 and 109 of the at least first conveyor belt 101. The adherence of the chocolate mass 106 may be enhanced by adapting the speed and cooling conditions of the cooling chamber 105 such that during transportation of the chocolate mass 106 along the first and second cooling path, a part of the chocolate mass 106 in contact with the outer surface of the top and bottom load carrying sides 108 and 109 of the conveyor belt 101 remains in liquid form. Furthermore, the material of the outer surface of the top and bottom load carrying sides 108 and 109 of the at least first conveyor belt 101 may further be chosen such that the chocolate mass adheres to the outer surfaces of the conveyor belt 101. For example, the outer surfaces of the at least first conveyor belt 101 may be made from a polymer based material such as plastic or rubber. In another example, the outer surfaces of the at least first conveyor belt 101 may be made from a metal-based material, such as aluminium.

According to an embodiment of the present invention the system 100 may further comprise a release mechanism 107 positioned at a location along the second cooling path, which may be arranged for releasing the chocolate mass 106 from the outer surface of the bottom load carrying side 109 of the at least first conveyor belt 101. For example, the release mechanism 107 may be provided with a cutting edge, such as in the form of a knife or scraper, suitable for dislodging the chocolate mass 106 from the outer surface of the bottom load carrying side 109 of the at least first conveyor belt 101 as shown in FIG. 1. The released chocolate mass 106 may be collected at an exit point 104 of the conveyor system.

Figure 2:
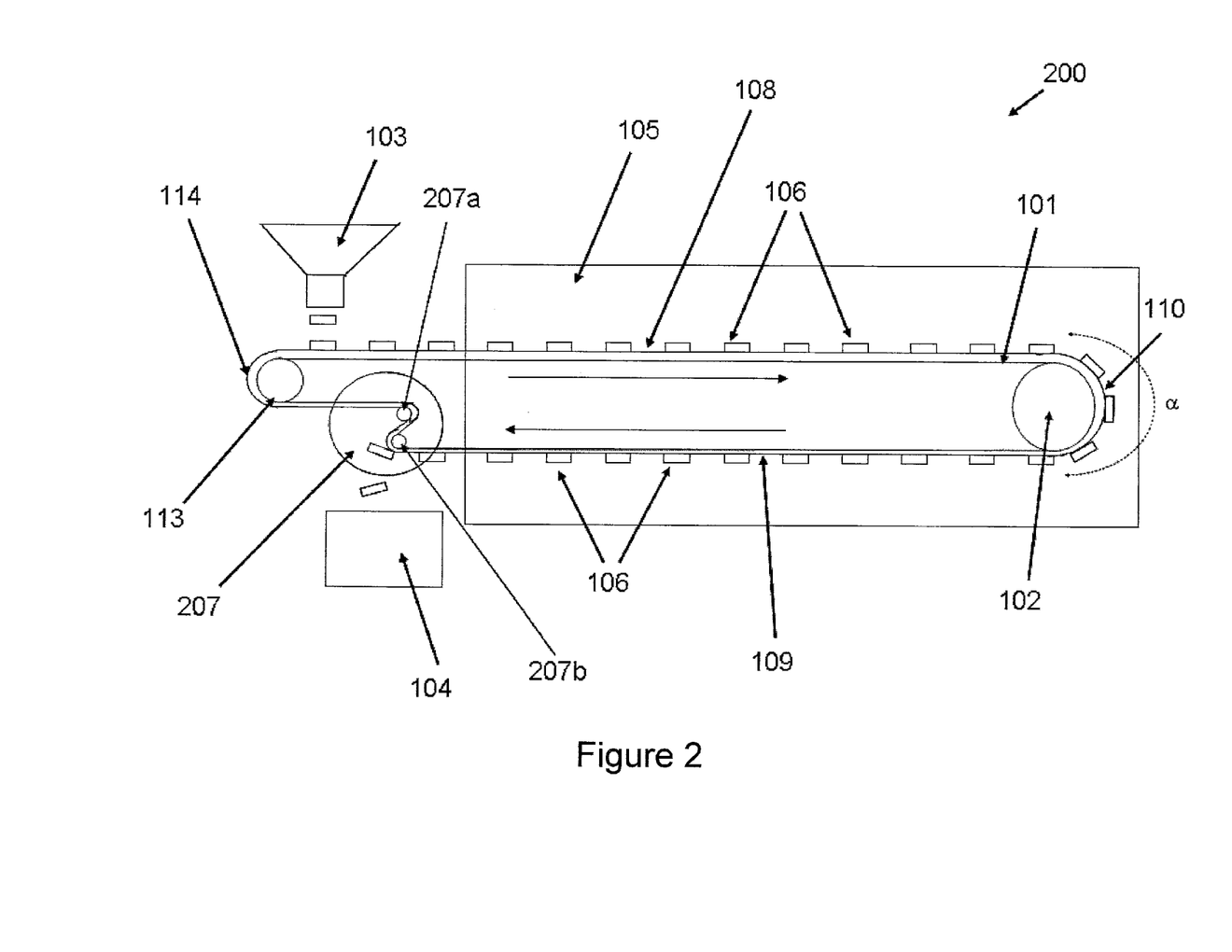

FIG. 2 show a further example of a system 200 according to embodiments of the present invention. The main difference of this example with the system 100 of FIG. 1 is that the release mechanism 207 comprises a sharp edge in the conveyor belt 101 formed by an arrangement of axes 207, 207b positioned along the second cooling path 109 and arranged to cooperate with the conveyor belt 101 such that the chocolate mass at the location of the release mechanism 207 may be subjected to a sudden change in the inclination of the conveyor belt 101 thereby causing the chocolate mass to be dislodged from the outer surface of the bottom load carrying side of the conveyor belt. According to further embodiments, not shown in the figures, the sharp edge may also be formed by using a second axis 113 with a substantially smaller diameter compared to the diameter of the first axis 110.

Figure 3:
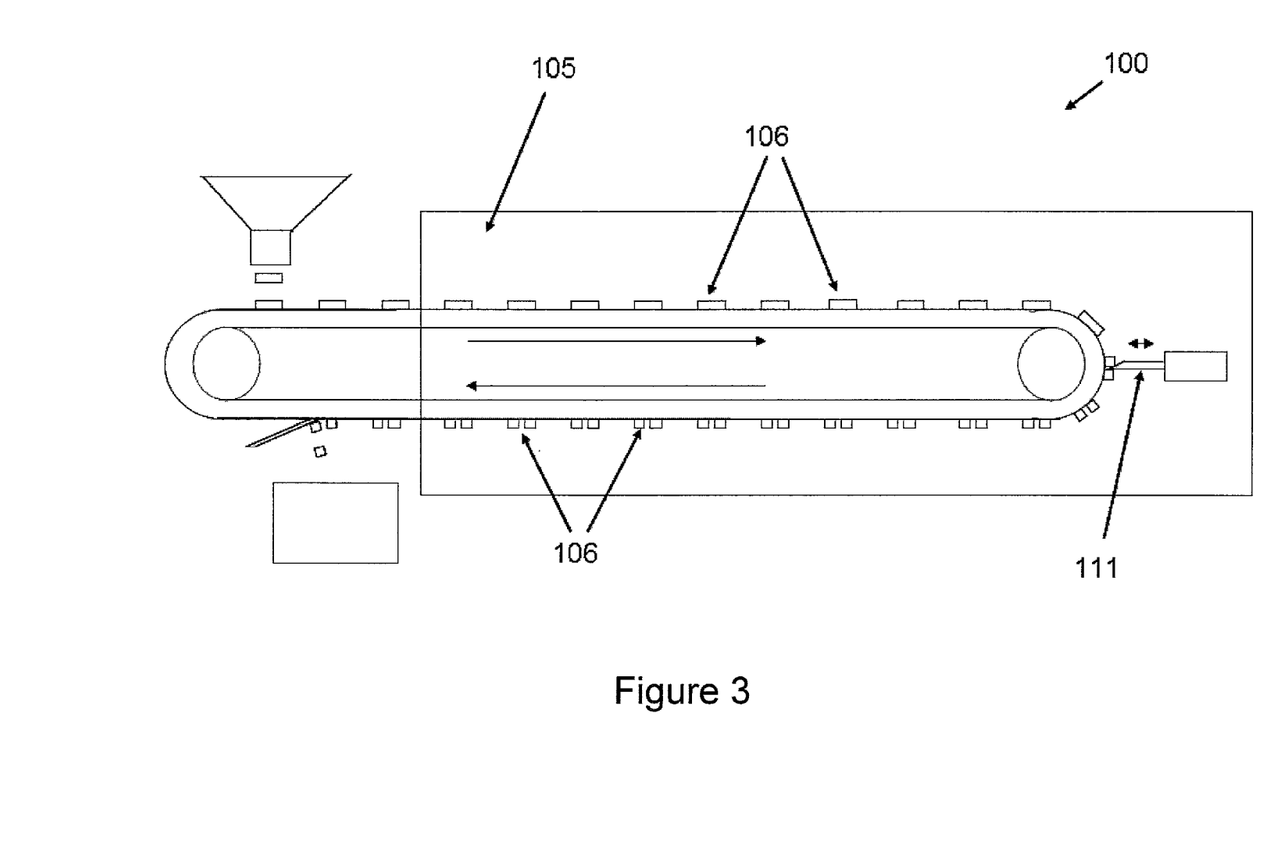

According to an embodiment of the present invention the system may further comprise a cutting mechanism 111 positioned at the location of at least the first curved surface 110, as shown in the example of FIG. 3. The function of the cutting mechanism would be further described with reference to the system 100. However, it should be noted that the use of the cutting mechanism 111 is not limited to the system 100 and that it can also be combined with the system 200, The use of a cutting mechanism 111 may be used for cutting the chocolate mass 106 into smaller pieces having a predetermined size. For example, the cutting mechanism 11 may be arranged as a servo chunks cutter mechanism having a cutting edge arranged to move at predetermined time internals in the direction of the arrow, as shown in the FIG. 3. Cutting the chocolate mass 106 into smaller pieces may prevent the chocolate mass 106 from being dislodged from the outer surface of the conveyor belt 101 during transportation along the curved surfaces 110 and 114.

According to an embodiment of the present invention, at least the first axis 102 may be designed to have a sufficient diameter so as to prevent the chocolate mass 106 from being dislodged from the outer surface of the conveyor belt 101 during transportation along the curved surfaces 110 and 114. For example, the first and second axes 102 and 113 may have a diameter of at least 100.0 mm, at most 1000.0 mm, preferably at most 800.0 mm, more preferably at most 500.0 mm, and even more preferably at most 400.0 mm.

According to embodiments of the present invention, in order to maintain sufficient tension of conveyor belt 101 around the first and second axes 102 and 113 the wrap angle $\alpha$ at least at the location of the first curved surface 102 may be in the range 120.0 to 180.0 degrees.

Figure 4:
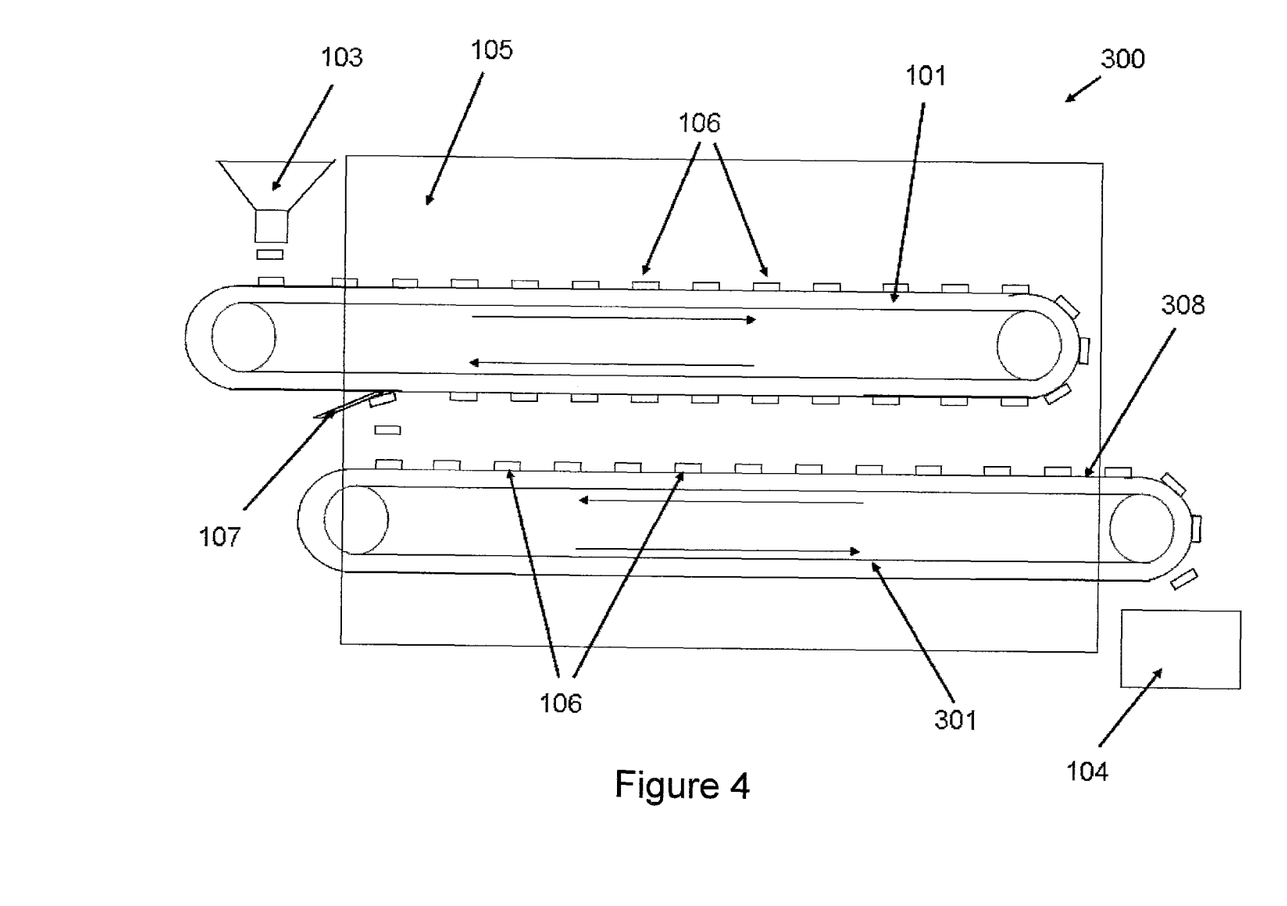
FIGS. 4 to 6 show cross-sectional views of a system for producing chocolate-based articles in solidifying form according to other embodiments of the present invention.

FIG. 4 shows a further example of a system 300 according to an embodiment of the present invention. The main difference with the systems shown in FIGS. 1 to 3 is that the transportation system of the system 300 may comprise at least a second conveyor belt 301 arranged for collecting the chocolate mass 106 released by the release mechanism 107. The at least second conveyor belt 301 may be arranged for transporting the chocolate mass 106 through the cooling chamber 105 along a third cooling path before the chocolate mass 106 is collected at the exit point 104 of the transportation system. In order to further reduce the area overhead of the system 300, the at least second conveyor belt may be positioned opposite the at least first conveyor belt 101 such that the third cooling path is positioned opposite the second cooling path, which second cooling path may be arranged along the bottom load carrying side 109 of the at least first conveyor belt 101. Furthermore, the transport direction of the chocolate mass 106 along the third cooling path may be opposite to that of the second cooling path. The third cooling path may be arranged on the top load carrying side 308 of the at least second conveyor belt 301.

Figure 5:
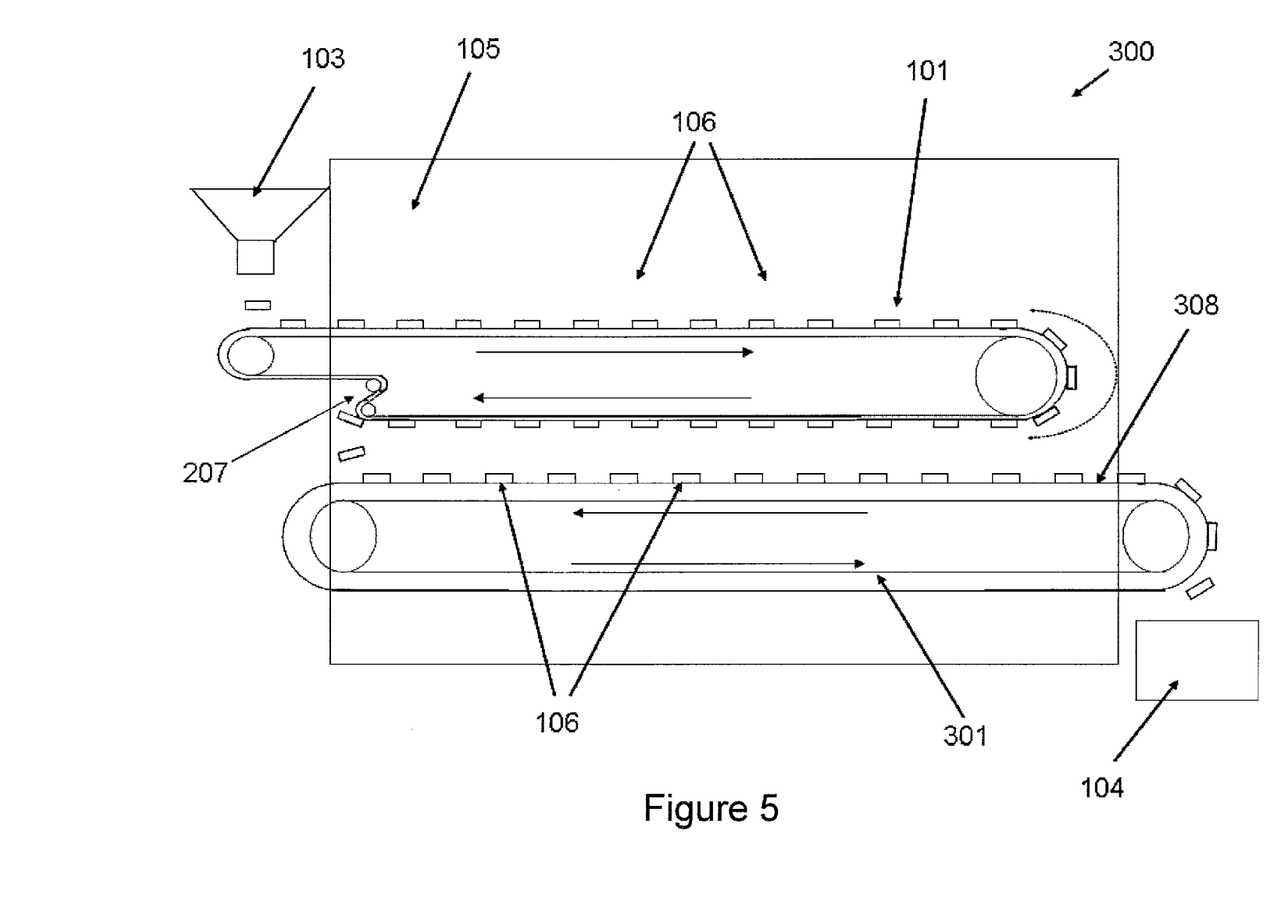

FIG. 5 shows a further example of the system 300 according to an embodiment of the present invention. The main difference with the system of FIG. 4 is that the at least second conveyor belt is combined with at least a first conveyor belt 101 having a release mechanism 207 according to the system 200 shown in FIG. 2.

Figure 6:
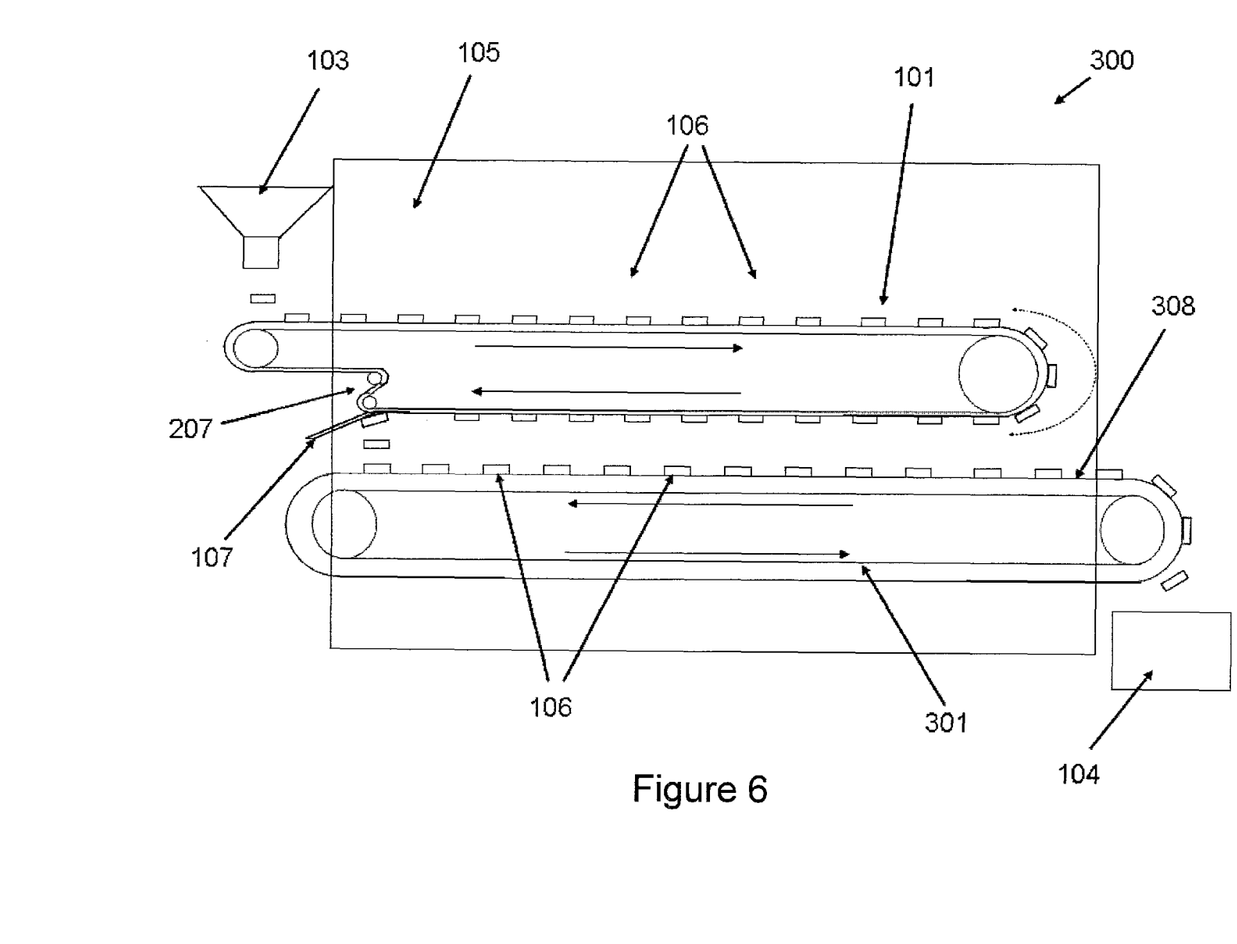

FIG. 6 shows yet a further example of the system 300 according to an embodiment of the present disclosure. The main difference with the systems shown in FIGS. 4 and 5 is that the at least first conveyor belt 101 comprises release mechanisms 207 and 107 according to the systems 100 and 200.

According to embodiments of the present invention, a method for producing chocolate-based articles in solidifying form may be provided. The method may comprise the steps of providing a transportation system having at least a first conveyor belt 101 looped around at least a first and a second axis 102 and 113. The at least first conveyor belt 101 may comprise a substantial flat top load carrying side 108 and a substantially flat bottom load carrying side 109 interconnected with one another via at least a first and second curved surfaces 110 and 114 formed respectively at the location of the at least first and second axes 102 and 113. At a next step chocolate mass 106 may be dispensed in liquid form along the top load carrying side 108 of the at least first conveyor belt 101 by means of a dispensing unit 103 positioned at an entry point of the transportation system. The liquid chocolate mass 106 is arranged to be transported at predetermined speed through at least one cooling chamber 105 by means of the at least first conveyor belt 101 along a first and a second cooling paths. The cooling chamber 105 may be arranged for cooling the liquid chocolate mass 106 under predetermined conditions before the solidified chocolate articles 106 are collected at an exit point 104 of the transportation system. According to an embodiment of the present invention, the method may further comprise the step of arranging the first and second cooling paths such that they are positioned opposite one another and connected via at least the first curved surface 110 so that the direction in which the chocolate mass 106 is transported in the second cooling path is opposite to that of the first cooling path. Furthermore, the method may comprise the step of providing a release mechanism 107 along the second cooling path. The release mechanism 107 may be arranged for releasing the chocolate mass 106 from an outer surface of the bottom load carrying side 109 of the at least first conveyor belt 101.

The invention claimed is:

1. A system for producing chocolate-based articles in solidifying form, the system comprising:
    a transportation system including at least a first conveyor belt looped around at least first and second axes, the at least first conveyor belt having a substantially flat top load carrying side and a substantially flat bottom load carrying side interconnected with one another via at least first and second curved surfaces formed respectively at the location of the at least first and second axes;

a dispensing unit arranged for dispensing chocolate mass in liquid form along an outer surface of the top load carrying side of the at least first conveyor belt at an entry point of the transportation system;

at least one cooling chamber arranged for cooling the chocolate mass under predetermined conditions before the chocolate mass is collected at an exit point of the transportation system, wherein the at least one conveyor belt is arranged for transporting the chocolate mass through the at least one cooling chamber at a predetermined speed along a first and a second cooling path, the first and second cooling paths being positioned opposite one another and connected via at least the first curved surface such that the direction in which the chocolate mass is transported in the second cooling path is opposite to that of the first cooling path;

a cutting mechanism positioned at the location of the first curved surface arranged for cutting the chocolate mass into predetermined size pieces; and a release mechanism positioned along the second cooling path, the release mechanism being arranged for releasing the chocolate mass from an outer surface of the bottom load carrying side of the at least first conveyor belt.

2. The system according to claim 1, wherein the first and second cooling paths are located respectively on the top load carrying side and bottom load carrying side of the conveyor belt.

3. The system according to claim 1, wherein the cooling conditions of the cooling chamber and speed of the at least first conveyor belt are configured such that the chocolate mass is arranged to adhere to the outer surfaces of the top and bottom load carrying sides of the at least first conveyor belt so that it can be transported from the first cooling path to the second cooling path via at least the first curved surface.

4. The system according to claim 3, wherein the material of the outer surface of the top and bottom load carrying sides of the at least first conveyor belt is further chosen such that the chocolate mass adheres to the outer surfaces of the at least first conveyor belt.

5. The system according to claim 4, wherein at least the outer surfaces of the at least first conveyor belt are made from a polymer based material.

6. The system according to claim 5, wherein at least the outer surfaces of the at least first conveyor belt are made from plastic.

7. The system according to claim 1, wherein at least the outer surfaces of the at least first conveyor belt are made from rubber.

8. The system according to claim 1, wherein the first axis is a pulley having a diameter of at least 100.0 mm and at most 1000.0 mm.

9. The system according to claim 1, wherein the wrap angle of the at least first conveyor belt at the location of at least the first axis is in the range of 120.0 to 180.0 degrees.

10. The system according to claim 1, wherein the at least first and second axes are pulleys, at least one of which being arranged as a drive pulley.

11. The system according to claim 1, wherein the dispensing unit is arranged for dispensing chocolate mass in the form of continuous strips.

12. The system according to claim 1, wherein the dispensing unit is arranged for dispensing chocolate mass in the form of individual droplets.

13. The system according to claim 1, wherein the release mechanism includes a cutting edge.

14. The system according to claim 13, wherein the release mechanism is a scraper.

15. The system according to claim 1, wherein the release mechanism comprises a sharp edge in the conveyor belt formed by an arrangement of axes arranged to cooperate with the at least first conveyor belt such that the chocolate mass at the location of the release mechanism is subjected to a sudden change in the inclination of the conveyor belt.

16. The system according to claim 1, wherein the transportation system includes at least a second conveyor belt arranged for collecting the chocolate mass released by the release mechanism.

17. The system according to claim 16, wherein the at least second conveyor belt is arranged for transporting the chocolate mass through the cooling chamber along a third cooling path.

18. The system according to claim 17, wherein the third cooling path is positioned opposite the second cooling path.

19. The system according to claim 17, wherein the transport direction of the chocolate mass along the third cooling path is opposite to that of the second cooling path.

* * * * *